July 25, 1944.  G. W. WALTON  2,354,235
DRAWWORKS WITH COMPOSITE DRIVE
Filed Feb. 19, 1941  2 Sheets-Sheet 1
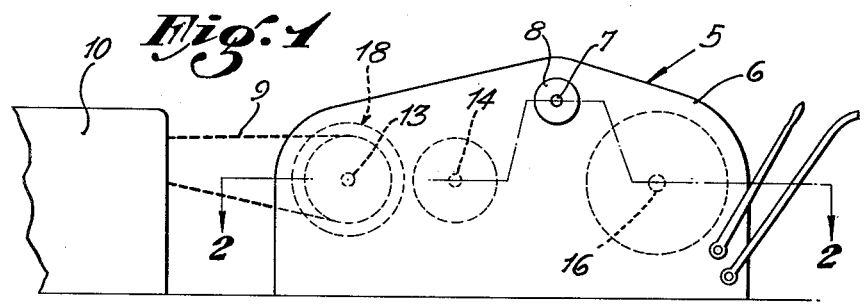
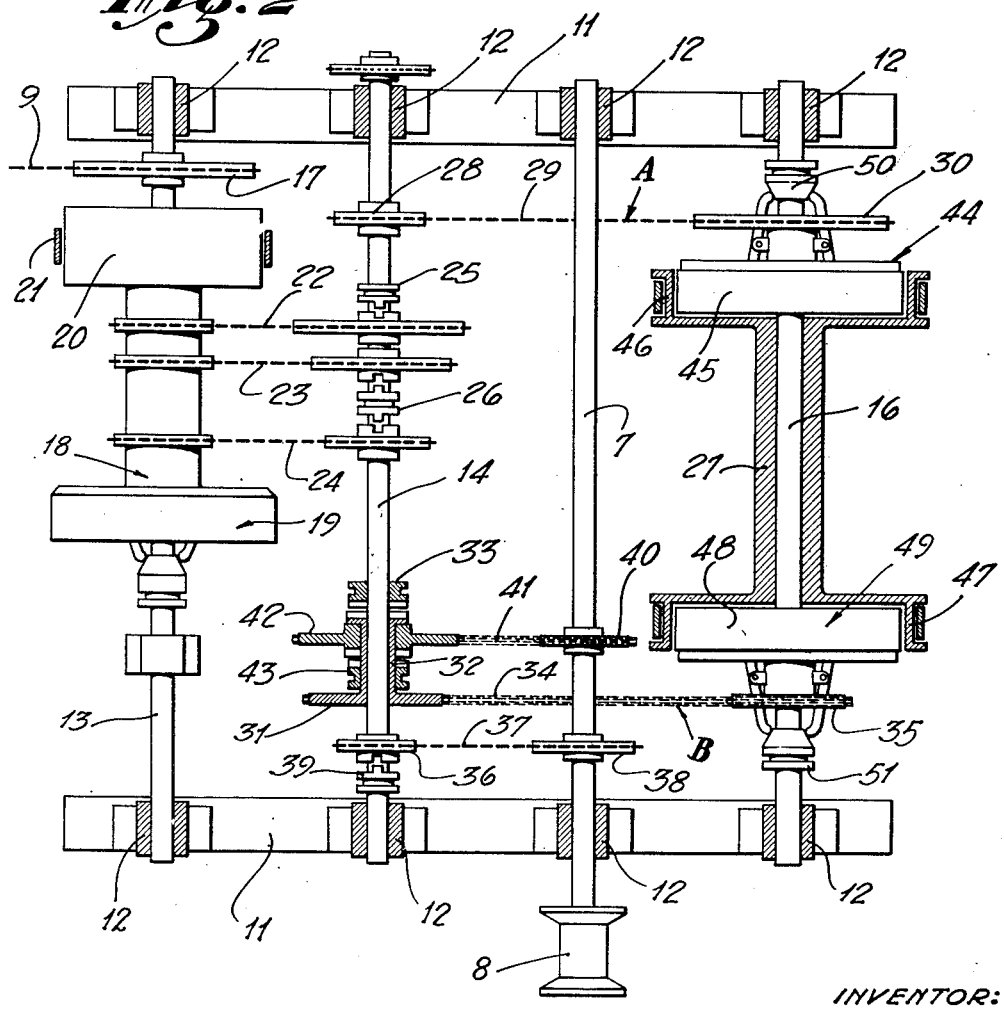
INVENTOR:
GEORGE W. WALTON,
BY
ATTORNEY.

July 25, 1944.  G. W. WALTON  2,354,235
DRAWWORKS WITH COMPOSITE DRIVE
Filed Feb. 19, 1941   2 Sheets-Sheet 2
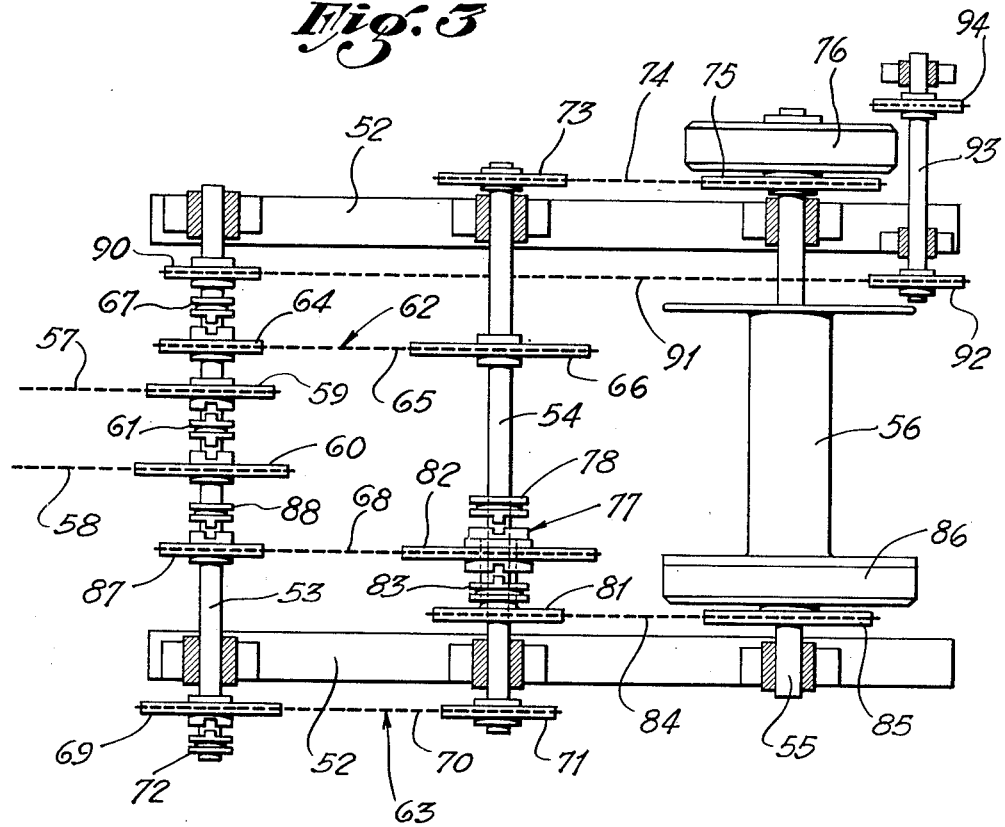
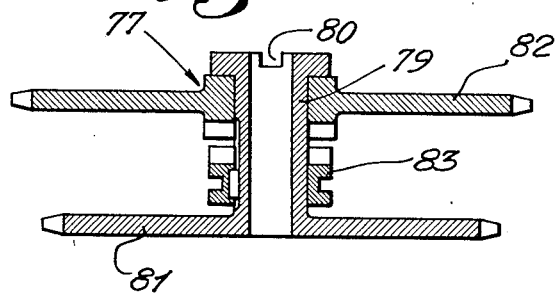

Patented July 25, 1944

2,354,235

UNITED STATES PATENT OFFICE 2,354,235

DRAW WORKS WITH COMPOSITE DRIVE

George W. Walton, Beverly Hills, Calif., assignor to Emsco Derrick & Equipment Company, Los Angeles, Calif., a corporation of California Application February 19, 1941, Serial No. 379,719

12 Claims. (Cl. 254—187)

My invention relates to drawworks of the type used in oil well drilling, and relates in particular to a drawworks having ease and flexibility of control and operation.

Drawworks of the type which have been employed for many years include a drum over which the cable is wound and a transmission including a number of shafts and cooperating jaw clutches adapted to be used in different combinations so as to obtain different speeds of rotation of the drum and likewise different values of torque applied to the drum shaft. In the operation of this old type of equipment, when it was desired to change from one speed to another, it became necessary to slow down or stop the rotating parts to enable engagement of the teeth of the jaw clutches. Also it was found in the use of this old type of drawworks that heavy strains were placed in the equipment due to sudden application of forces or loads. It is an object of my present invention to provide a drawworks wherein different speeds of rotation may be quickly obtained and the application of sudden or severe strains in the equipment may be minimized by the employment of friction clutches to transmit power to working parts of the drawworks, such as for example, the drawworks drum. My new drawworks not only provides smoother operation of the equipment, but also smoother operation from the standpoint of the workmen. For example, the driller may apply power to the drum merely by engaging a friction clutch, or may change from one speed of rotation to another by operation of a second friction clutch, thereby avoiding the labor and delay, and also impact shock of engagement, found in the use of the old type of drawworks.

It is a further object of my invention to provide a drawworks having a drum with a plurality of friction clutches, any one of which may be engaged to transmit power to the drum, each clutch being connected into the transmission in such a manner that engagement of one of the friction clutches will drive the drum at a low speed and engagement of the other friction clutch will drive the drum at a higher speed. A further and important object of the invention is to provide in conjunction with the friction clutches set forth in the foregoing means of adjustment in the transmission associated therewith whereby the high speed clutch may be driven at the same speed as the other clutch, thereby making it possible for the driller to engage both clutches simultaneously and thereby have available the capacity of both clutches when an exceptionally heavy load is to be moved or when one of the clutches is not capable of handling the load by itself, as, for example, when one clutch may be worn or slipping, or when one of the clutches may have become overheated. This provides an ever present safety factor in the equipment. Although the friction clutches are designed so as to each efficiently carry a full capacity load, the operator has the assurance of ample or excess power at any time through the simultaneous use of both clutches should trouble develop in either clutch.

It is an object of the invention to provide in a drawworks having a drum, a transmission for driving the drum including friction clutch means which comprises a pair of rotatable clutching elements adapted to be either singly or simultaneously actuated, such clutching elements having driving connection with the drum, and the transmission having chains and sprockets so connected that when one of the clutching elements is actuated, the drum will be driven at a low speed, and when the other clutching element is actuated, the drum will be driven at a higher speed, and a chain and sprocket arrangement which may be selectively brought into use when it is desired to employ both clutches simultaneously and which will cause the clutching elements to be rotated at the same speed.

It is also an object of the invention to provide in a drawworks having a drum a transmission having drivable members in driving connection with the drum, whereby the drum may be driven throuhg either of these drivable members, by the transmission of power to such drivable members at different speeds of rotation, and also having means operable to rotate the drivable members at the same speed of rotation and to simultaneously apply power thereto when it is desired to drive the drum through the simultaneous use of both of the drivable members, thereby bringing to the drum the driving ability of both of the drivable members during emergencies or when extremely heavy loads are to be handled.

Further objects and advantages of the invention will be brought out in the following part of the specification.

Referring to the drawings which are for illustrative purposes only:

Fig. 1 is a somewhat schematic side elevation of a drawworks embodying a preferred form of my invention.

Fig. 2 is a diagrammatic sectional view taken in general as indicated by the line 2—2 in Fig. 1 and showing only that part of the mechanism within the drawworks housing which pertains directly to my present invention.

Fig. 3 is a diagrammatic plan view showing another embodiment of my invention.

Fig. 4 is an enlarged sectional view of the quill and sprocket assembly employed in Fig. 3.

In Fig. 1 I schematically show a drawworks 5 including a housing 6 from which a shaft 7 extends so as to support a cat head 8. This drawworks may be driven through a chain 9 from a power device 10.

As shown in Fig. 2, the drawworks include supports 11 and bearings 12 carrying a jack shaft 13, a line shaft 14, the cat shaft 7 and a drum shaft 16, preferably in parallel alignment, with the cat shaft 7 elevated with respect to the other shafts so that the cat head 8 will occupy an elevated position. Power from the power source 10 is transmitted to the chain 9 to the jack shaft 13 through a sprocket 17, and on the jack shaft 13 there is a reversing clutch having a direct drive clutch 19 and a reversing gear 20 with its band 21. The reversing clutch 18 has three drives 22, 23, and 24 of chain and sprocket type for driving the line shaft 14 at low, intermediate, and high speeds, there being clutch means 25 and 26 for selectively connecting the drives 22, 23, and 24 to the line shaft 14.

The power transmission shown in Fig. 2 comprises two drives for the drum 27, the first or low-speed drive A employing a sprocket 28 connected through a chain 29 with a sprocket 30 which revolves around the axis of the drum shaft 16. The second, or high-speed, drive B comprises a sprocket 31 fixed on a quill 32 which rotates freely relative to the line shaft 14 except when the clutch 33 is actuated to drivably connect the shaft 14 and the quill 32. From the sprocket 31 a chain 34 is extended to a sprocket 35 rotatable around the axis of the drum shaft 16. To drive the cat shaft 7 I provide on the line shaft 14 a sprocket 36 which is connected through a chain 37 with a sprocket 38 on the cat shaft 7, with a jaw clutch 39 for selective drive connection of the shaft 14 and the sprocket 36. A sprocket 40, shown fixed on the shaft 7, is connected through a chain 41 with a sprocket 42 which is rotatable on the quill 32, but may be clutched to the quill 32 by a jaw clutch 43.

The form of the invention shown in Fig. 2 has multiple friction clutch means comprising a rotatable clutching element 44, having an expansible friction shoe 45 arranged to be actuated into frictional driving engagement with a drivable drum 46 disposed at the far end of the drum 27. The sprocket 30 is directly connected to the member 44. At the near end of the drum 27 there is a drivable member 47 adapted to be engaged by the expansible friction shoe 48 of a rotatable clutching element 49 which has the sprocket 35 mounted thereon.

In the ordinary driving of the drum 27 through use of the power transmission of the drawworks, selective use of the clutches 25 and 26 will bring into action one of the drives 22, 23, and 24, thereby making it possible to drive the line shaft 14 at any one of three speeds. The clutch 33 will be then engaged so that the quill 32 and the sprocket 31 will rotate with the shaft 14. Then, if the driller desires to rotate the drum 27 at low speed, he will through suitable mechanism not shown move the clutch cone 50 so as to actuate the friction shoes 45 into engagement with the annular wall or drum 46, with the result that the drum 27 will be rotated at a speed determined by the ratio of the sprockets 28 and 29. Should a higher speed of rotation of the drum 27 be desired, the rotatable clutching element 49 will be actuated by movement of the clutch cone 51 to bring the friction shoe 48 into engagement with the cylindrical wall or drum 47 which is connected to the drum 27, so that the drum 27 will be driven through sprockets 31 and 35. Should the load to be handled be excessive, or in the opinion of the driller such as might place undue strain on either of the friction clutches, the driller may readily adjust the drive mechanism so as to rotate the clutching elements 44 and 49 at the same speed and then simultaneously actuate these clutching elements. In this event, the driller will disengage the clutch 33 and will engage the clutches 39 and 43 so that the rotation of the line shaft 14 will be transmitted from the sprocket 36 to the sprocket 38 to rotate the shaft 7 and the sprocket 40 which, through the chain 41 will drive the sprocket 42 now clutched to the quill 32 so as to drive the sprocket 31. The sprockets 36, 38, 40, and 42 are selected with relation to the sprockets 31 and 35 so that when the auxiliary drive now in effect will drive the sprocket 35 and the clutching element 49 at the same speed of rotation as the clutching element 44. When the clutching elements 44 and 49 are simultaneously actuated any lost movement or play will be taken up by slippage in one or the other of the friction clutches as the shoes 45 and 48 are brought into complete engagement with the parts 46 and 47. At this time the power transmitting ability of both of the friction clutches will be effective and the drum 27 may be employed to move a load of correspondingly increased magnitude.

In the form of the invention shown in Fig. 3, I have shown supports 52 carrying a jack shaft 53, a line shaft 54 and a drum shaft 55 which supports a drum 56. From a power source such as a stream or internal combustion engine, the shaft 53 may be driven at two speeds through chains 57 and 58 and sprockets 59 and 60 having jaw clutch means associated therewith. So that the shaft 54 may be driven at four speeds, I connect the same with the shaft 53 through a low speed transmission 62 and a high speed transmission 63. The low speed transmission comprises a sprocket 64 on the shaft 53 which is connected through a chain 65 with a sprocket 66 on the shaft 54, there being an associated clutch means 67 for coupling and uncoupling this drive. The drive means 63 comprises a pulley 69 on the shaft 53, connected through a chain 70 with a sprocket 71 fixed on the shaft 54, there being a clutch 72 for coupling and uncoupling this high speed drive.

A sprocket 73 on the far end of the shaft 54 is connected through a chain 74 with a sprocket 75 which is directly connected to one of the parts of a friction clutch 76 adapted to connect the sprocket 75 with the shaft 55 on which the drum 56 is fixed, so that by actuation of the clutch 76 the drum 56 will be driven from the shaft 54 at relatively low speed. For driving the drum at a relatively high speed from the shaft 54, the following arrangement is provided. A quill and sprocket assembly 77 is mounted on the shaft 54 so as to have free rotation relative to the shaft 54 except when an associated jaw clutch 78 is engaged so as to couple the shaft 54 and the assembly 77 for synchronous rotation. The quill and sprocket assembly 77 is made substantially as shown diagrammatically in Fig. 4. The quill assembly 77 includes a sleeve 79 having clutch jaw means 80 at the far end thereof and a sprocket 81 fixed on the rear end thereof. A sprocket 82 is rotatably mounted on the sleeve 79, and jaw clutch means 83 are provided on the sleeve 79 to couple the sprocket 82 and the sleeve 79 together for synchronous rotation.

As shown in Fig. 3, the sprocket 81 is connected through a chain 84 with a sprocket 85 directly connected to the friction clutch 86 which may be selectively actuated to connect the sprocket 85 to the drum 56 so that the drum 56 will be thereby rotated, provided that the clutch means 78 is engaged with the quill and sprocket assembly 77 so as to cause the sprocket 81 to rotated with the shaft 54. The sprockets 81 and 85 are so proportioned that a speed of rotation of the drum 56 will be accomplished which is higher than the speed at which the sprocket 75 will rotate the drum 56. Accordingly, the driller by selective actuation of the friction clutches 76 and 86 may drive the drum 56 from the shaft 54 at two different speeds for any given rotation of the shaft 54, and since the shaft 54 may be driven at four different speeds by selective operation of the clutch means 61, 67, and 72, eight different speeds of rotation of the drum 56 may be obtained by the means previously described. Should the driller desire to drive the drum 56 simultaneously through the friction clutches 76 and 86, he may adjust the transmission by bringing into play the following auxiliary transmission elements. The floating sprocket 82 of the quill and sprocket assembly 77 is connected through a chain 68 with a drive sprocket 87 adapted to be coupled to the shaft 53 by clutch means 88. After first releasing the clutch 78 so as to uncouple the assembly 77 from the shaft 54, the clutch 83 is engaged so as to couple the sprocket 82 to the sleeve 79 of the quill, and the clutch 88 is engaged thereby driving the sprocket 81 directly from the initial power shaft or jack shaft 53. The sprockets 82 and 87 are so proportioned relative to the sprockets 81 and 85 that the speed of rotation of the sprocket 85 will be now the same as the speed of the sprocket 75 when it is driven from the shaft 53 through the sprockets 64 and 66, the shaft 54, the sprocket 73 and the connecting chains 62 and 74. Accordingly, if the driller now determines that the clutch 67 is engaged and the clutch 72 is disengaged, he will be assured of a like rotation of the sprockets 75 and 85, so that both of the clutches 76 and 86 may be actuated so that the drum 56 will be driven through both of them.

An additional ultimate low speed of drive for the drum 56 may be obtained by releasing the clutches 67 and 72, engaging the clutch 88, engaging the clutch 83, and engaging the clutch 78. As a result of this adjustment of clutches, the rotation of the shaft 53 will be transmitted to the shaft 54 through the sprocket 87, the chain 68, and the sprocket 82. Since the sprocket 87 is of small diameter as compared to the sprocket 82, the shaft 54 will be rotated at slow speed, and this speed of rotation of the shaft 54 will be further reduced by the transmission element consisting of the sprocket 73, the chain 74, and the sprocket 75. For the purpose of illustration, I have shown a sprocket 90 on the shaft 53 connected through a chain 91 with a sprocket 92 to drive the rotary power take-off shaft 93 which has thereon a sprocket 94 for chain connection with the rotary machine.

I claim as my invention:

1. In a drawworks having a drum, a means for driving the drawworks drum from a source of power, including: multiple friction clutch means for driving said drum, comprising a first rotatable friction clutching element and a second rotatable friction clutching element, said clutching elements being arranged so that they may be separately or simultaneously engaged whereby said drum may be driven through either or both of said clutching elements; a first transmission means connecting said source of power and said first clutching element, to rotate the same at a relatively low speed; a second transmission means connecting said source of power and said second clutching element, to drive the same at a relatively high speed; and means for effecting rotation of said second clutching element at the same speed as said first clutching element so that said drum may be driven through both of said clutching elements simultaneously, comprising auxiliary transmission means and means for substituting said auxiliary transmission means for at least a part of said second transmission means.

2. In a drawworks having a drum, a means for driving the drawworks drum from a source of power, including: multiple friction clutch means for driving said drum, comprising a first rotatable friction clutching element and a second rotatable friction clutching element, said clutching elements being arranged so that they may be separately or simultaneously engaged whereby said drum may be driven through either or both of said clutching elements; a first transmission means connecting said source of power and said first clutching element, to rotate the same at a relatively low speed; a second transmission means connecting said source of power and said second clutching element, to drive the same at a relatively high speed; and means for changing the driving speed ratio of said second transmission means so that said second clutching element will be rotated at the same speed as said first clutching element, to enable the driving of said drum simultaneously through both of said clutching elements.

3. In a drawworks having a drum, a means for driving the drawworks drum from a source of power, including: multiple friction clutch means for driving said drum, comprising a first rotatable friction clutching element and a second rotatable friction clutching element, said clutching elements being arranged so that they may be separately or simultaneously engaged whereby said drum may be driven through either or both of said clutching elements; a first transmission means connecting said source of power and said first clutching element, to rotate the same at one speed; a second transmission means connecting said source of power and said second clutching element, to drive the same at another speed; and means for effecting rotation of said second clutching element at the same speed as said first clutching element so that said drum may be driven through both of said clutching elements simultaneously.

4. In a drawworks having a drum, a means for driving the drawworks drum from a source of power, including: multiple friction clutch means for driving said drum, comprising a first rotatable friction clutching element and a second rotatable friction clutching element, said clutching elements being arranged so that they may be separately or simultaneously engaged whereby said drum may be driven through either or both of said clutching elements; a first transmission means connecting said source of power and said first clutching element, to rotate the same at one speed; a second transmission means connecting said source of power and said second clutching element, to drive the same at another speed; and means for changing the driving speed ratio of said second transmission means so that said second clutching element will be rotated at the same speed as said first clutching element, to enable the driving of said drum simultaneously through both of said clutching elements.

5. In a drawworks having a drum, a means for driving the drawworks drum from a source of power, including: multiple friction clutch means for driving said drum, comprising a first rotatable friction clutching element and a second rotatable friction clutching element, said clutching elements being arranged so that they may be separately or simultaneously engaged whereby said drum may be driven through either or both of said clutching elements; transmission means connecting said power source with said clutching elements, to normally rotate said first clutching element at one speed and said second clutching element at another speed; and means of adjustment for said transmission means operable to effect therein a driving of said clutching elements at the same speed, so that simultaneous actuation of said clutching elements will accomplish the driving of said drum through both of said clutching elements.

6. In means for driving a drawworks drum, the combination of: multiple clutch means for driving said drum comprising a plurality of rotatable clutching elements and means to selectively actuate said clutching elements; transmission means connected to said clutching elements and normally driving each of said clutching elements at a different speed of rotation; and means of adjustment for said transmission means selectively operable to effect through said transmission means a driving of said clutching elements all at the same speed of rotation whereby simultaneous actuation of said clutching elements will accomplish the driving of said drum through all of them.

7. In means for driving a drawworks drum, the combination of: a plurality of drivable members, each having driving connection with said drum; transmission means connected to said drivable members and being selectively operable to drive said drivable members each at a different speed of rotation; and transmission means selectively operable to drive said drivable members all at the same speed of rotation whereby said drum may be then driven through all of said drivable members.

8. In a drawworks of the character described, the combination of: a support; a jack shaft on said support; a line shaft on said support; a drum shaft on said support; a drum on said drum shaft; a first driven sprocket on said drum shaft at one end of said drum; a second driven sprocket on said drum shaft at the other end of said drum; first and second friction clutches operative to connect said first and second driven sprockets respectively to said drum; means for driving said line shaft from said jack shaft; a first drive sprocket drivable by said line shaft and being connected to said first driven sprocket for driving said drum at a relatively low speed; a quill on said line shaft having thereon a second drive sprocket connected to said second driven sprocket for driving said drum at a relatively high speed; a quill clutch on said line shaft for clutching and unclutching said quill onto said line shaft; and auxiliary sprocket rotatable on said quill; auxiliary clutching means for clutching said auxiliary sprocket to said quill; and speed reducing sprocket and chain means connecting said line shaft and said auxiliary sprocket, said speed reducing means being of such value that when said quill clutch is released and said auxiliary clutching means is engaged, said second drive sprocket will drive said second driven sprocket at the same speed of rotation as said first driven sprocket.

9. In a device for moving loads of different magnitude at different speeds, the combination of: a power output member adapted to be operatively connected to the load to be moved; and transmission means operatively associated with said member, for driving said member at different speeds, said transmission means comprising a plurality of trains of mechanism each having a different driving speed ratio and each having as a part thereof a clutch element so as to independently drive said member, at least one of said clutch elements being of a type to gradually transmit driving force, said transmission means having means of adjustment operable so that said trains of mechanism, when the clutch elements thereof are simultaneously operated, will all drive said power output member at the same speed.

10. In a device for moving loads of different magnitude at different speeds, the combination of: a power output member adapted to be operatively connected to the load to be moved; and transmission means operatively associated with said member, for driving said member at different speeds said transmission means comprising a plurality of trains of mechanism each having a different driving speed ratio and each having as a part thereof a clutch element so as to independently drive said member, said clutch elements being of a type to gradually transmit driving force, said transmission means having means of adjustment operable so that said trains of mechanism, when the clutch elements thereof are simultaneously operated, will all drive said power output member at the same speed.

11. In a device for moving loads of different magnitude at different speeds, the combination of: a power output member adapted to be operatively connected to the load to be moved; and transmission means operatively associated with said member, for driving said member at different speeds, said transmission means comprising a plurality of trains of mechanism, each having a different driving speed ratio and each having as a part thereof a clutch element so as to independently drive said member, said transmission means having means of adjustment operable so that said trains of mechanism, when the clutch elements thereof are simultaneously operated, will all drive said power output member at the same speed, said transmission means incorporating means operating automatically to substantially equalize the driving forces transmitted through the said trains of mechanism thereof when said adjustment means is operated and said clutch elements are simultaneously operated.

12. A transmission for driving a member in the drawworks of a drilling rig, said transmission including an input shaft and an output shaft, said output shaft having two independently rotatable portions, clutch means for establishing a direct drive connection between said portions, a drive connection from each portion of said output shaft to said member, said drive connections being adapted to provide different drive speeds when said clutch is engaged, an auxiliary shaft, auxiliary drive connections between said auxiliary shaft and each portion of said output shaft and including a clutch, said auxiliary drive connections being adapted to bring each of the drive connections between the output shaft and said member to the same speed so that they may be employed to simultaneously drive said member.

GEORGE W. WALTON.